Nov. 2, 1948.         H. GETTER         2,452,745
STILL PICTURE ATTACHMENT FOR
MOVING PICTURE PROJECTORS
Filed April 3, 1946
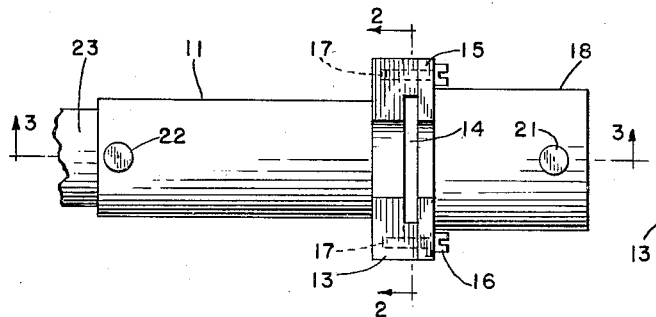
FIG. 1.
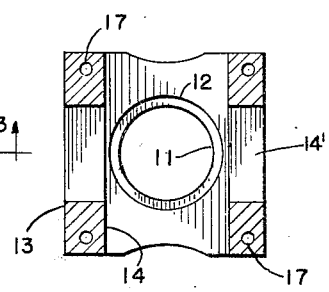
FIG. 2.
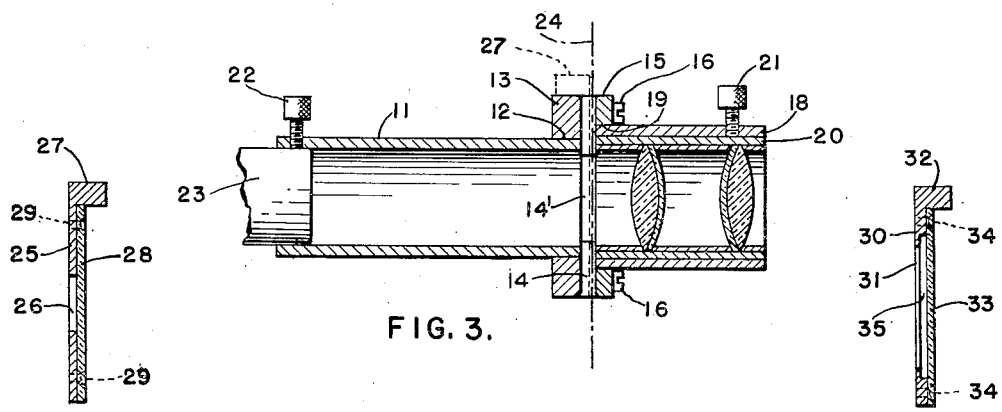
FIG. 3.   FIG. 6.   FIG. 7.
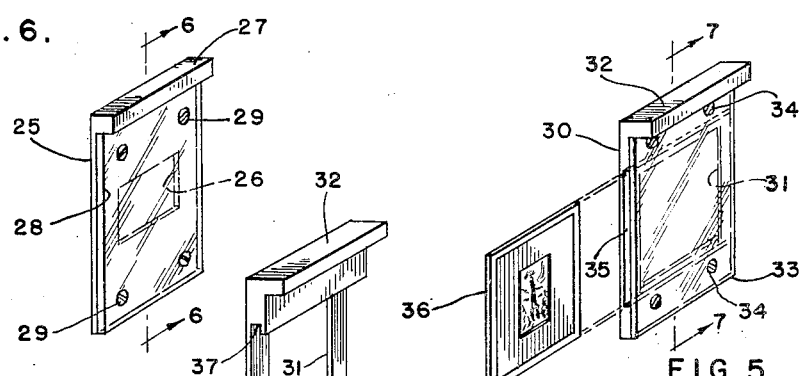
FIG. 4.   FIG. 5.   FIG. 8.
INVENTOR.
HERMAN GETTER,
BY
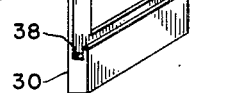
ATTORNEY

UNITED STATES PATENT OFFICE 2,452,745

STILL PICTURE ATTACHMENT FOR MOVING PICTURE PROJECTORS

Herman Getter, Bronx, N. Y.

Application April 3, 1946, Serial No. 659,372

1 Claim. (Cl. 88—28)

This invention relates to improvements in an attachment for projection apparatus, and more particularly to an adapter adjustable upon a projector and capable of projecting any portion of a motion picture film while it is held stationary in the projector.

An object of this invention is the inclusion therein of a means for shielding the picture which is to be projected, from the heat of the illuminating lamp.

Another object of this invention is the provision in a device of the character described, wherein suitable means are provided to attach the device upon the lens casing of a projector.

Another object of this invention is the provision therein of means for threading a film through the device and maintaining same in a stationary position to project a picture or any portion of a film to a distant screen.

A further object of this invention is the inclusion therein of means for adjusting the focussing lens.

A further object of my invention is the inclusion therein of a frame to be attached to the device to carry a single mounted picture or a strip of mounted pictures.

A still further object of this invention is the provision of an organization in which the constituent elements are so arranged structurally and functionally as to assure improved results with materials which may be manufactured at reasonable cost, may be easily assembled and which will be efficient in operation with minimum wear to the parts.

This invention possesses other objects and features of advantage, some of which, with the foregoing, will be set forth in the following description and in the claim wherein parts will be identified by specific names for convenience. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claim. The invention itself, however, both as to its organization and its method of operation, together with additional objects and advantages thereof, will best be understood from the following description of a specific embodiment when read in connection with the accompanying drawings, in which:

Figure 1 is a top view of the adapter.

Figure 2 is a transverse section taken along the line 2—2 of Figure 1.

Figure 3 is a longitudinal section taken along the line 3—3 of Figure 1.

Figure 4 is an isometric view of a screen which fits in a slotted portion of the device, and will be hereinafter described.

Figure 5 is an isometric view of a holder which is adapted to fit in said slot upon the device, and is employed when projecting slides.

Figure 6 is a sectional elevational view taken along the line 6—6 of Figure 4.

Figure 7 is a sectional elevational view taken along the line 7—7 of Figure 5.

Figure 8 is an isometric view of a modified form.

Referring in detail to the parts, 11 designates a tubular casing threaded at 12, to one side of a block 13, and terminating at a slot 14, formed through the said block and closed by a plate 15, which is secured to the block 13, by means of screws 16, engaging in threaded perforations 17. A second tubular casing 18, is threaded upon the said plate 15, at 19.

Slideably engaging within the said tubular casing 18, is a lens-carrying member 20, which is adjustable therein and is held in proper focussing position by means of a finger-operated set-screw 21. A second finger-operated set-screw 22, engages through the aforesaid tubular casing 11, and affords a means for securing the device upon the projecting end 23, of the casing carrying the projector lens.

A motion picture film 24, shown by dot-dash line in Figure 3, may be threaded through the said slot 14, and any selected picture upon the said film may be projected upon a screen or flat distant surface when the said film is held stationary within the device.

To protect the film from damage by the intense heat of the projector lamp a shield (Figure 4) is provided, consisting of a plate 25, having a perforated central portion 26, and upper supporting ledge 27, and a transparent member 28, secured to the plate 25, by means of counter-sunk screws 29. The transparent member 28, may be of colorless plastic material or any other suitable transparent substance having high heat-resisting quality. The said shield is adapted to engage within the aforesaid slot 14, and is suspended therein by the ledge 27, which engages over the top end of the block 13, as shown by the dotted lines in Figure 3. With this said shield attachment any section of a motion picture film may be projected through the adapter when the said film is held stationary, without injury to the film from the heat of the projector lamp.

In Figure 5 there is shown a holding member, somewhat similar in form to the shield shown in Figure 4. The said holding member, however, consists of a backing plate 30, having a large central perforation 31, a supporting ledge 32, and a facing plate 33, of any suitable transparent material which has a high heat-resisting quality. The said facing plate 33, is secured to the backing plate 30, by means of counter-sunk screws 34. A groove is formed in the said backing plate 30, and with the said facing plate 33, forms a transverse passage 35, through which a single picture mounted in a frame 36, may be fed. A branch or side slot 14' is formed in block 13 in alignment with the passage 35 of holder 30 through which the said mounted pictures may be fed.

The modified form shown in Figure 8 omits the transparent facing plate 33, shown in Figure 5, and replaces the passage 35, also shown in Figure 5, by forming grooves 37 and 38, through which the mounted picture 36, of Figure 5, may be passed. This form of holder is employed when it is not necessary to protect the picture from the heat of the projector lamp.

I claim:

An attachment for motion picture machines, comprising an inner cylindrical section detachably secured, at one end, to a projector of a motion picture machine, a block element having a vertical slot, a horizontal slot and a central opening formed therein, secured to the opposite end of said inner cylindrical section, the said opening being concentrically aligned with the said inner cylindrical section, an outer cylindrical section concentrically attached to the said block element and a lens holding cylinder having lenses therein and slideable within the said outer cylindrical section, the said vertical slot in said box element adapted to receive and guide a motion picture film therethrough and hold same stationary therein to permit a single picture projection, and the said horizontal slot in said box element adapted to receive a single framed stationary picture for projection therefrom.

HERMAN GETTER.

REFERENCES CITED

The following references are of record in the file of this patent:

UNITED STATES PATENTS

| Number | Name | Date |
|---|---|---|
| 1,174,208 | Walsh | Mar. 7, 1916 |
| 1,434,219 | Mengel | Oct. 31, 1922 |
| 1,550,320 | Isbills | Aug. 18, 1925 |
| 1,636,647 | Patterson | July 19, 1927 |
| 1,931,228 | Kitroser | Oct. 17, 1933 |
| 2,153,149 | McHarg | Apr. 4, 1939 |
| 2,243,160 | Koehl | May 27, 1941 |
| 2,276,735 | Miller | Mar. 17, 1942 |
| 2,305,664 | Bogopolsky | Dec. 22, 1942 |
| 2,315,914 | Wengel | Apr. 6, 1943 |
| 2,438,333 | Dickman | Mar. 23, 1948 |